(12) United States Patent
Wach et al.

(10) Patent No.: US 8,028,137 B2
(45) Date of Patent: Sep. 27, 2011

(54) SYSTEM AND METHOD OF SELECTIVE DATA MIRRORING IN A DATA STORAGE DEVICE

(75) Inventors: Joseph L. Wach, Longmont, CO (US); Timothy Richard Feldman, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 487 days.

(21) Appl. No.: 11/961,823

(22) Filed: Dec. 20, 2007

(65) Prior Publication Data

US 2009/0164742 A1    Jun. 25, 2009

(51) Int. Cl.
*G06F 12/16* (2006.01)
(52) U.S. Cl. .......... 711/162; 711/161; 714/6.1; 714/6.2; 714/6.23
(58) Field of Classification Search .................. 711/161, 711/162; 714/6, 6.1, 6.2, 6.23
See application file for complete search history.

(56) References Cited

U.S. PATENT DOCUMENTS

| | | | |
|---|---|---|---|
| 5,185,662 A | 2/1993 | Liston | |
| 5,572,660 A | 11/1996 | Jones | |
| 5,615,352 A | 3/1997 | Jacobson et al. | |
| 5,742,792 A | 4/1998 | Yanai et al. | |
| 5,819,310 A | 10/1998 | Vishlitzky et al. | |
| 5,835,953 A | 11/1998 | Ohran | |
| 6,023,584 A | 2/2000 | Barton et al. | |
| 6,237,008 B1 | 5/2001 | Beal et al. | |
| 6,910,098 B2 | 6/2005 | LeCrone et al. | |
| 6,931,499 B2 | 8/2005 | Delaney et al. | |
| 7,099,903 B2 * | 8/2006 | Kawamura | 707/640 |
| 7,107,320 B2 | 9/2006 | Busser et al. | |
| 7,152,182 B2 | 12/2006 | Ji et al. | |
| 7,165,141 B2 | 1/2007 | Cochran et al. | |
| 7,254,683 B2 | 8/2007 | Burton et al. | |
| 7,254,686 B2 | 8/2007 | Islam et al. | |
| 7,278,049 B2 | 10/2007 | Bartfai et al. | |
| 7,421,552 B2 * | 9/2008 | Long | 711/162 |
| 2006/0020754 A1 * | 1/2006 | Suzuki et al. | 711/114 |

* cited by examiner

*Primary Examiner* — Jae Yu
(74) *Attorney, Agent, or Firm* — Deirdre Megley Kvale; Westman, Champlin & Kelly, P.A.

(57) ABSTRACT

Systems and methods of selective data mirroring are disclosed. In a particular embodiment, a device is disclosed that includes a data storage medium and a controller operably coupled to the data storage medium. The controller configured to selectively enable a data mirroring function to copy data in a first data storage location of the data storage medium to one or more second data storage locations of the data storage medium when the one or more second data storage locations do not have valid primary data stored to them.

24 Claims, 5 Drawing Sheets

400

| Region | # of writes |
|--------|-------------|
| A | 1 |
| B | 1,001 |
| C | 1,976 |
| D | 17 |
| E | 29 |
| F | 543 |
| G | 12,045 |
| H | 789 |
| I | 0 |

FIG. 4

SYSTEM AND METHOD OF SELECTIVE DATA MIRRORING IN A DATA STORAGE DEVICE

FIELD OF THE DISCLOSURE

The present disclosure is generally related to selective data mirroring in a data storage device.

BACKGROUND

Data mirroring is a technique used to enhance reliability in data storage arrays. In a typical storage array that employs data mirroring, the mirroring can be accomplished by writing the information at two different locations. Some systems write the information 180 degrees out of phase on the same disc; thus, reducing the capacity of the drive by at least half. On the other hand, some systems write the data from one disc drive onto a second disc drive in the array; this method requires having a second drive for every first drive in the array. These systems require twice as much data storage space to meet the non-mirrored design requirements. Consequently, such systems can be expensive and inefficient.

Therefore, a need exists for a system of providing data mirroring at a more efficient rate and lower cost. More specifically, a need exists for a solution to the problem of mirroring fast input/output drives, while reducing the cost incurred in mirroring without decreasing the system performance.

Therefore, there is a need for an improved system and method of data mirroring in a data storage device.

BRIEF DESCRIPTION OF THE DRAWINGS

FIG. 4 is a diagram of an illustrative embodiment of a table for selective data mirroring in a disc drive.

DETAILED DESCRIPTION

In the following detailed description, reference is made to the accompanying drawings which form a part hereof, and in which are shown by way of illustration of specific embodiments. It is to be understood that other embodiments may be utilized and structural changes may be made without departing from the scope of the present invention.

In a particular embodiment, a device is disclosed that includes a data storage medium and a controller operably coupled to the data storage medium. The controller configured to selectively enable a data mirroring function to copy data in a first data storage location of the data storage medium to one or more second data storage locations of the data storage medium when the one or more second data storage locations do not have valid primary data stored to them.

In another particular embodiment, a method is disclosed that includes storing first information in a memory to allow identification of data storage locations of a data storage medium that do not have valid primary data stored at them. The method also includes selectively enabling a data mirroring function to copy first valid primary data from a first data storage location of the data storage medium to a second data storage location when the second data storage location does not have valid primary data stored to it. The method further includes copying the first valid primary data from the first data storage location to the second data storage location when the data mirroring function is enabled.

In yet another particular embodiment, a computer-readable medium is disclosed that includes instructions to cause a processor to execute a method that includes storing information in a memory to identify data storage locations of a data storage medium that have not had valid primary data written to them. The method also includes selectively enabling a data mirroring function to copy first valid primary data from a first data storage location of the data storage medium to a second data storage location when the second data storage location does not have valid primary data stored to it. The method further includes copying the first valid primary data from the first data storage location to the second data storage location when the data mirroring function is enabled.

Figure 1:
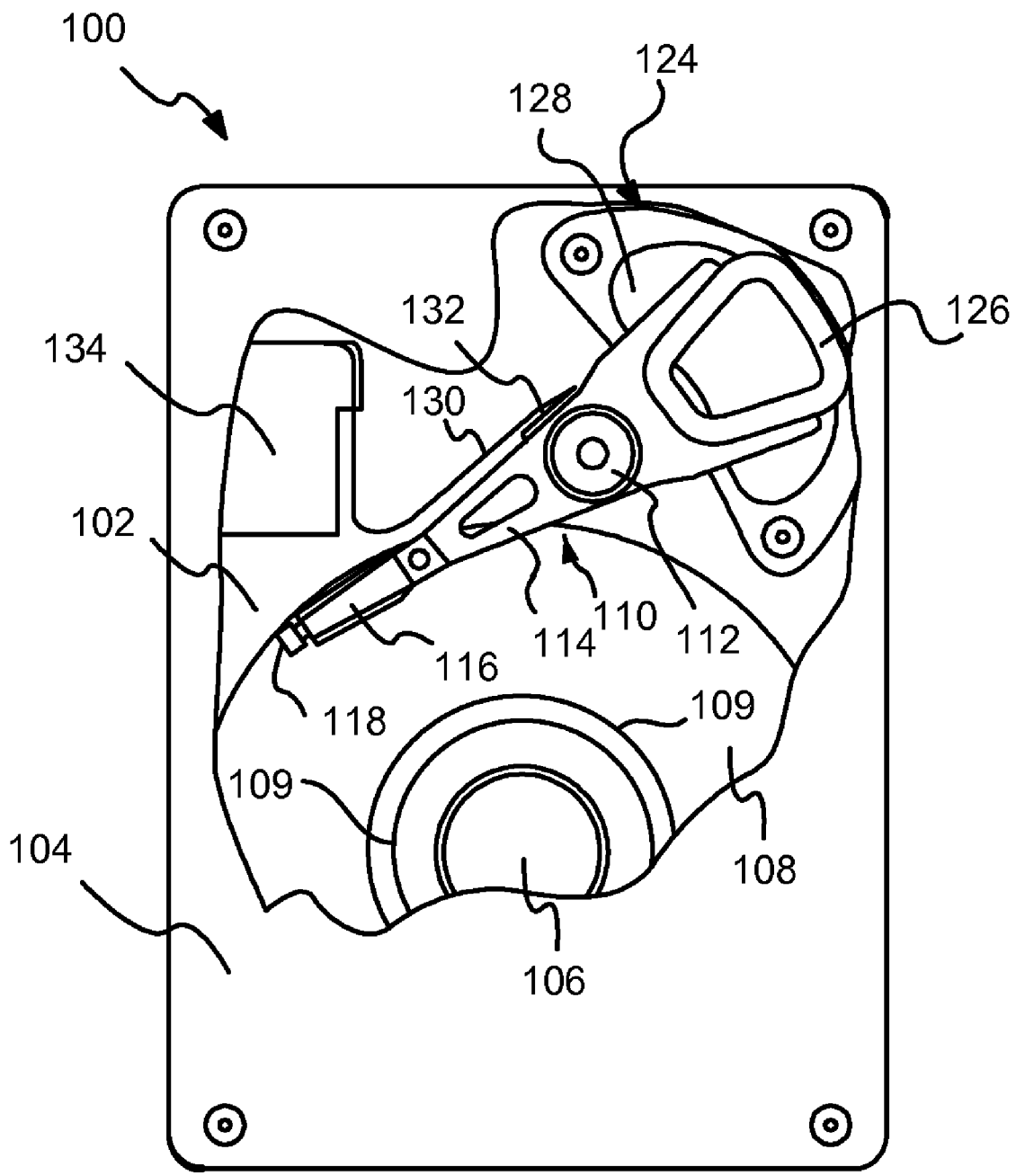
FIG. 1 is a cutaway view of an illustrative embodiment of a disc drive for selective data mirroring.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotates about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

Figure 2:
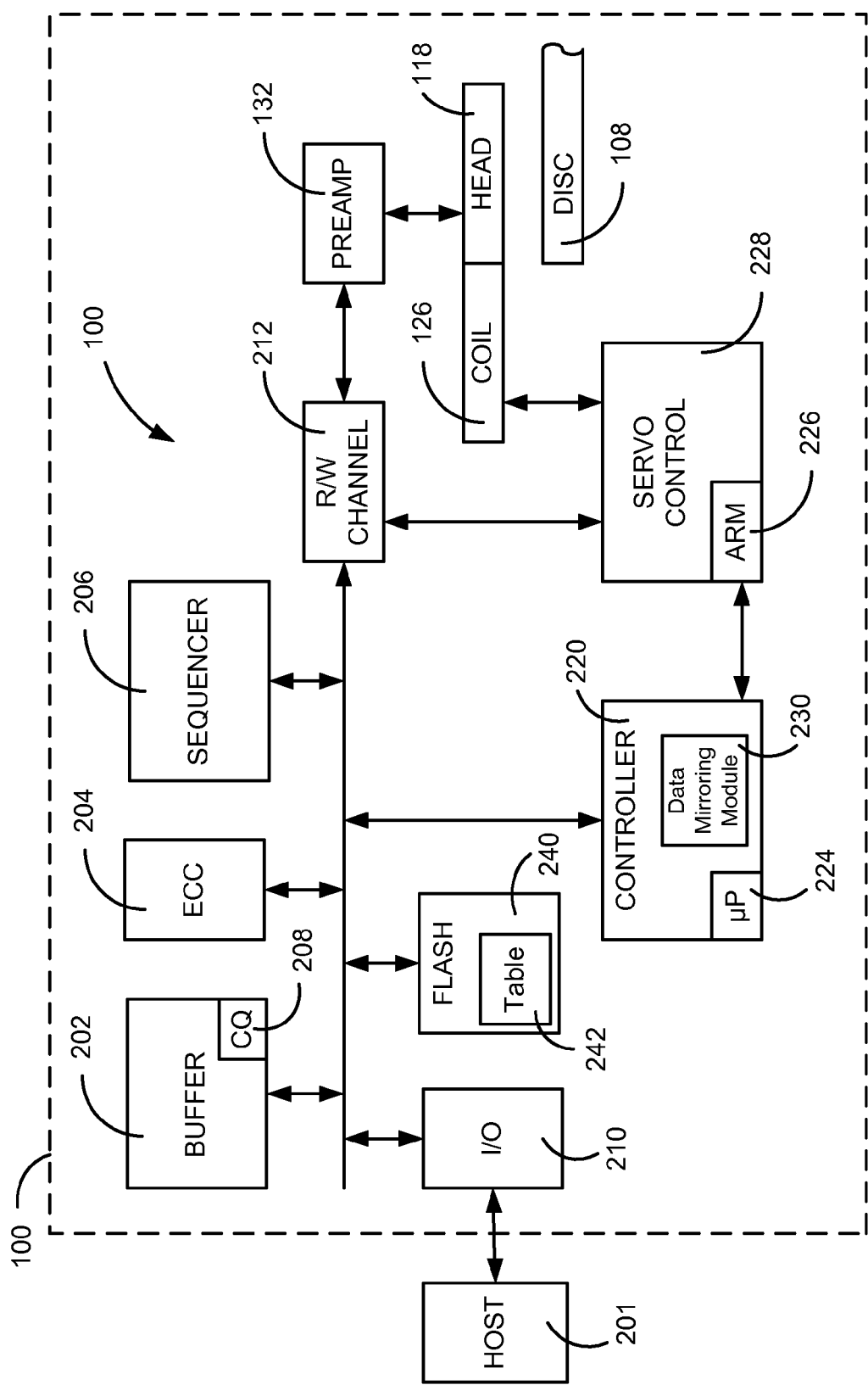
FIG. 2 is a block diagram of an illustrative embodiment of a disc drive system for selective data mirroring.

FIG. 2 provides a functional block diagram of the disc drive 100. The disc drive 100 can communicate with a host device 201 (such as a personal computer) and directs overall disc drive operation. The disc drive 100 can include a programmable controller 220 with an associated microprocessor 224. The disc drive 100 may also include a buffer 202, an error correction code (ECC) block 204, a sequencer 206, and an input/output (I/O) control block 210.

The buffer 202 can temporarily store user data during read and write operations, and may include a command queue (CQ) 208 where multiple pending access operations can be temporarily stored pending execution. The ECC block 204 may apply on-the-fly error detection and correction to retrieved data. The sequencer 206 can assert read and write gates to direct the reading and writing of data. The I/O control block 210 serves as an interface with the host device 201.

FIG. 2 further shows the disc drive 100 may include a read/write (R/W) channel 212 that can encode data during write operations and reconstruct user data retrieved from the discs 108 during read operations. A preamplifier/driver circuit (preamp) 132 can apply write currents to the heads 118 and can provide pre-amplification of readback signals.

A servo control circuit 228 may use servo data to provide the appropriate current to the coil 126 to position the heads 118. The controller 220 can communicate with a processor 226 to move the heads 118 to the desired locations on the disc 108 during execution of the various pending commands in the command queue 208.

In a particular embodiment, the disc drive 100 may also include a solid state non-volatile memory device 240. For example the solid state non-volatile memory device 240 may be a flash memory device. The flash memory device may be used to store a table 242 that can include information to identify data storage locations of the data storage medium that have not had valid primary data written to them. Valid primary data includes a most recent version of data stored to a storage location of a data storage medium. The table may list the data storage locations that have had valid primary data written to them or the data storage locations that have not had valid primary data written to them. The table can be updated to keep the table current when valid primary data is written to or removed from a data location.

The controller 220 may also include a data mirroring module 230 that is operable to perform a data mirroring function to copy valid primary data from a first memory location of the discs 108 to a second memory location of the discs 108 when the second memory location does not have valid primary data stored to it, based on the information stored in the table 242. In a particular embodiment, the controller 220 may enable the data mirroring function when there are enough data storage locations that do not have valid primary data written to them to mirror substantially all valid primary data stored on the discs 108. In another particular embodiment, the controller 220 may enable the data mirroring function when there are enough data storage locations, that do not have valid primary data written to them, to mirror a selected subset of valid primary data stored on the discs 108, where the selected subset may be less than all of the valid primary data that is available for data mirroring.

In a particular embodiment, the selected subset may include valid primary data stored in a specific region of the discs 108. The controller 220 may store data in the specific region based on a criticality of the data. For example, data corresponding to word processing documents may be more critical than data corresponding to a video or audio file. The data mirroring module 230 may selectively mirror data that exceeds a threshold based on a level of criticality of the data. The data mirroring module 230 may also selectively mirror data based on a type of the data or a location of the data. For example, the data mirroring module 230 may selectively mirror a specific type of data, such as spreadsheet data. In another example, the data mirroring module 230 may selectively mirror data stored in a specific file allocation table location such as a folder.

In another particular embodiment, the controller 220 may receive an indication from an operating system of the host 201 that valid primary data should be mirrored when there is sufficient storage capacity. The indication may be an indicator relating to a type of the valid primary data, a level of criticality of the valid primary data, or an enable mirroring command.

In yet another particular embodiment, the controller 220 may retrieve secondary data from a mirror location when an original memory location is not available. The original memory location may not be available due to read errors, media errors, erasure, or numerous other issues. In still yet another embodiment, the controller 220 may retrieve secondary data from a mirror location when secondary data at the mirror location can be retrieved faster than valid primary data at an original memory location. For example, the controller 220 may retrieve secondary data from a mirror location when a read head, such as the heads 118 shown in FIG. 1, can reach a copy of data at a mirrored location faster than the valid primary data at the original location. This may be determined based on a relative position of a read head to the mirrored location, the original location, or a number of rotations necessary to reach each location.

Figure 3:
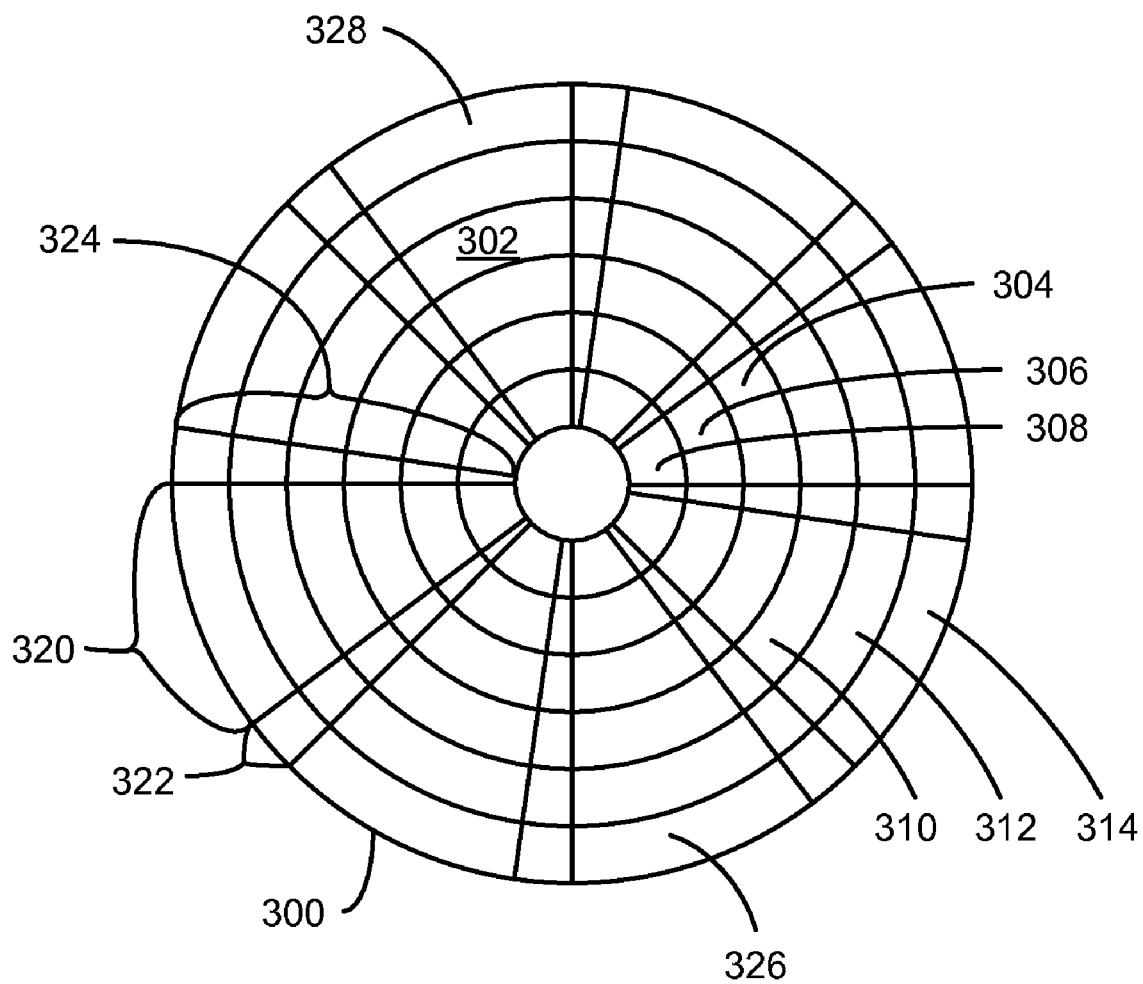
FIG. 3 is a general diagram of an illustrative embodiment of a data storage surface in a disc drive.

FIG. 3 is a diagrammatic representation of a simplified top view of a disc 300, such as one of the discs 108 shown in FIG. 1 and FIG. 2, having a surface 302. As illustrated in FIG. 3, the disc 300 includes a plurality of concentric tracks 304, 306, 308, 310, 312, and 314 for storing data on the surface 302. Although FIG. 3 only shows a relatively small number of tracks (i.e., 6) for ease of illustration, it should be appreciated that typically tens of thousands of tracks are included on the surface 302 of the disc 300.

Each track 304, 306, 308, 310, 312, and 314 is divided into a plurality of data sectors 320 and a plurality of servo sectors 322. The servo sectors 322 in each track can be radially aligned with servo sectors 322 in the other tracks, thereby forming servo wedges 324 which extend radially across the disc 300.

In a particular embodiment, a system, such as the disc drive 200 shown in FIG. 2, may copy data from a first particular region 326 to a second particular region 328, such that two copies of the data exist on the disc 300. In a particular embodiment, the first particular region 326 and the second particular region 328 may be located 180 degrees from each other on the surface 302. In another particular embodiment, the first particular region 326 and the second particular region 328 may be located at any of the locations of data sectors 320 on the surface 302. The system may select the second particular region so that data at the second particular region is likely to be retrieved faster than data at the first particular region.

FIG. 4 is a diagram of an illustrative embodiment of a table 400 that may be used for selective data mirroring in a data storage device. In a particular embodiment, the table 400 lists data storage locations that have had valid primary data written to them. The data storage locations listed in the table may comprise a region of data storage locations. The region may comprise one or more sectors, one or more tracks, or a surface of a disc, such as the disc 300 shown in FIG. 3. In another particular embodiment, the table 400 may store information related to data storage locations that do not have valid primary data written to them.

The table 400 may be used to determine when to perform a selective mirroring function. In a particular embodiment, when the table 400 includes information to determine that sufficient storage space exists at a data storage medium, a data storage device may mirror selected data.

Figure 5:
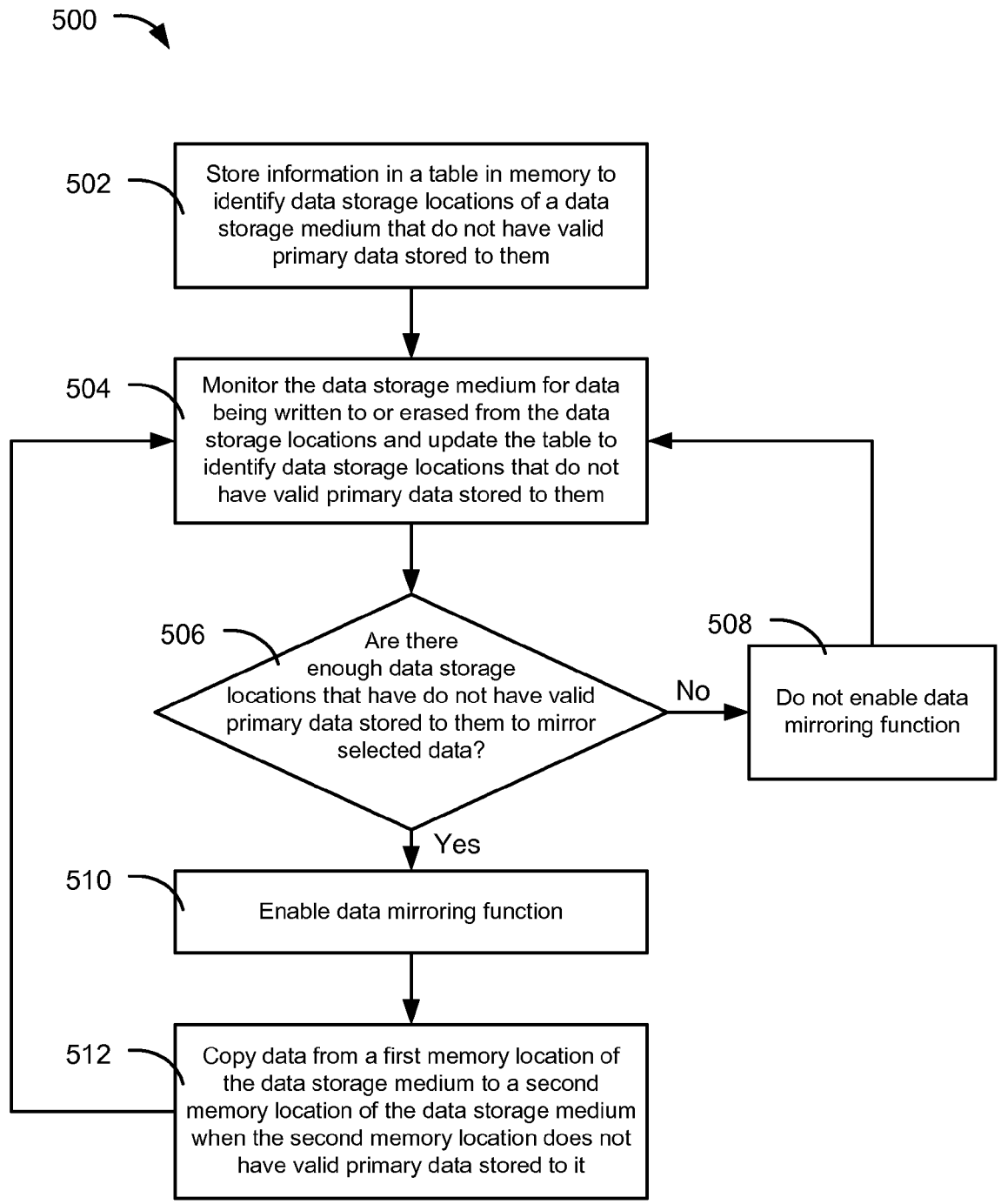
FIG. 5 is a flow diagram of a particular illustrative embodiment of a method of selective data mirroring.

Referring to FIG. 5, a flow diagram of a particular illustrative embodiment of a method of selective data mirroring is depicted and generally designated 500. The method 500 includes storing information in a table, such as the table 400 depicted in FIG. 4, in memory to determine data storage locations of a data storage medium that do not have valid primary data written to them, at 502. In a particular embodiment, the table may be store in a non-volatile solid state memory, such as the flash memory 240 shown in FIG. 2. In a particular embodiment, valid primary data can be user data.

The table may store information related to data storage locations that have had valid primary data written to them, information related to data storage locations that do not have valid primary data written to them, information related to data storage locations that are not currently in use by the user, or information related to data storage locations that are currently in use by the user. In a particular embodiment, the table may store information identifying a number of data store operations that have occurred in a specific region.

The method 500 may also include monitoring the data storage medium for data being written to or erased from the data storage locations and updating the table to identify data storage locations that do not have valid primary data written to them, at 504. The table can be updated to keep the information in the table current. Also, the table can be updated, such as after data is stored, to indicate that a memory location has valid primary data stored to it. Further, the table can be updated, such as after data is unwritten, to indicate that a memory location does not have valid primary data stored to it.

The method 500 may also include determining when there are enough data storage locations that do not have valid primary data stored to them to mirror selected data, at 506. When there is not enough data storage locations that do not have valid primary data stored to them to mirror the selected data, the method 500 does not enable a data mirroring function, at 508. The method 500 may then return to the monitoring, at 504. When there is enough data storage locations that do not have valid primary data stored to them to mirror the selected data, the method 500 enables a data mirroring function, at 510.

The data mirroring function may copy data from a first memory location of the data storage medium to a second memory location of the data storage medium when the second memory location does not have valid primary data stored to it, at 512. The method 500 may then return to the monitoring, at 504.

In a particular embodiment, the method 500 may be implemented in a data storage device, such as the disc drive 100 shown in FIG. 1 and FIG. 2, to execute in real-time. The data storage device may selectively mirror data based on an available unused capacity of data storage. In a particular embodiment, the data storage device may selectively mirror data from a first data storage medium to a second data storage medium. In another particular embodiment, the first data storage medium and the second data storage medium may be a different type of data storage medium. For example, the first data storage medium may be a magnetic disc and the second data storage medium may be a non-volatile solid state memory, such as flash memory.

Selective data mirroring may improve reliability by providing multiple copies of selected data, improve performance by providing multiple copies that may allow faster access times, or both. In a particular embodiment, the data storage device may select a secondary data storage location for the data mirroring to increase a reliability of the data storage device. For example, the data storage device may choose a region of a data storage medium known to have a relatively high reliability to store the mirrored data. In another particular embodiment, the data storage device may choose another data storage medium of a different type to store the mirrored data, such as a non-volatile solid state memory.

In another particular embodiment, the data storage device may also select a secondary data storage location for the data mirroring such that the mirrored data is likely to be retrieved when the original data storage location is not available. In another particular embodiment, the data storage device may select a secondary data storage location for the data mirroring based on when data at the secondary data storage location can be retrieved faster than at the original data storage location. In another particular embodiment, the data storage device may select a secondary data storage location for the data mirroring based on when data at the secondary data storage location can be retrieved using less energy than data at the original data storage location. In another particular embodiment, the data storage device may select a secondary data storage location for the data mirroring based on when data at the secondary data storage location can be retrieved more quietly than data at the original data storage location.

In another particular embodiment, a data storage device, such as the disc drive 100 shown in FIG. 1 and FIG. 2, may selectively retrieve data from a second data storage location that stores mirrored data when data at the second data storage location can be retrieved faster than the primary data at the original data storage location. A controller of the data storage device may implement an algorithm to determine a first access time to an original data storage location and a second access time to a second data storage location that contains data mirrored from the original data storage location. The controller may then select to retrieve the primary data from the original data storage location or the mirrored data from the second data storage location based on which location has a faster access time. The controller may selectively implement this feature based on user input, a setting of the data storage device, a setting of a system incorporating the data storage device, or any combination thereof.

In yet another particular embodiment, a data storage device, such as the disc drive 100 shown in FIG. 1 and FIG. 2, may selectively retrieve data from a second data storage location that stores mirrored data when data at the second data storage location can be retrieved using less energy than data at the original data storage location. A controller of the data storage device may implement an algorithm to determine a first energy estimate to access an original data storage location and a second energy estimate to access a second data storage location that contains data mirrored from the original data storage location. The controller may then select to retrieve the primary data from the original data storage location or the mirrored data from the second data storage location based on which location can be accessed using less energy. For example, when a disc drive's spindle motor is not rotating at a speed sufficient to read data from a disc, the disc drive may choose to retrieve data from a second data storage location that contains mirrored data when the second data storage location can be accessed by expending less energy than may be needed to increase the rotational speed of the spindle motor. This may occur when the second data storage location that stores the mirrored data is a non-volatile solid state memory, such as a flash memory. The controller may selectively implement this feature based on user input, a setting of the data storage device, a setting of a system incorporating the data storage device, or any combination thereof.

In yet another particular embodiment, a data storage device, such as the disc drive 100 shown in FIG. 1 and FIG. 2, may selectively retrieve data from a second data storage location that stores mirrored data when data at the second data storage location can be retrieved more quietly than data at the original data storage location. A controller of the data storage device may implement an algorithm to determine a first noise measurement estimate to access an original data storage location and a second noise estimate to access a second data storage location that contains data mirrored from the original data storage location. The controller may then select to retrieve the primary data from the original data storage location or the mirrored data from the second data storage location based on which location can be accessed while causing the least amount of noise. For example, when a disc drive's spindle motor is not rotating at a speed sufficient to read data from a disc, the disc drive may choose to retrieve data from a second data storage location that contains mirrored data when the second data storage location can be accessed by creating less noise than may be needed to increase the rotational speed of the spindle motor. This may occur when the second data storage location that stores the mirrored data is a non-volatile solid state memory, such as a flash memory. The controller may selectively implement this feature based on user input, a setting of the data storage device, a setting of a system incorporating the data storage device, or any combination thereof.

Further, the data storage device may selectively disable data mirroring when a larger capacity of data storage for valid primary data is needed. When data mirroring is disabled, the data storage device may make the locations used for the data mirroring available for storing other valid primary data. The data storage device may make previous mirror locations available by returning the secondary data storage locations to a state that does not have associated data and does not hold valid primary data. This may be done by erasing or deallocating the locations previously used for data mirroring.

In a particular embodiment, a user may enable a selective data mirroring function. In another particular embodiment, a data storage device may determine when to implement a selective data mirroring function without input from a user. For example, the data storage device may selectively enable a data mirroring function when a sufficient capacity exists to mirror selected data. In a particular embodiment, a controller can selectively enable and disable a data mirroring function based on information in a table and without receiving direction from a source external to the device controller by the controller.

In accordance with various embodiments, the methods described herein may be implemented as one or more software programs running on a computer processor or controller, such as the controller 220. In accordance with another embodiment, the methods described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device comprising:
   one or more data storage media providing a first data storage location and a second data storage location; and
   a controller operably coupled to the one or more data storage media to selectively enable a data mirroring function to copy data in the first data storage location to the second data storage location, such that two copies of the data exist on the one or more data storage media, and the controller is configured to implement a selection algorithm to select one of the first or second data storage locations to retrieve the data, wherein the selection algorithm uses at least one of access time, energy estimate, noise estimate, head position or spindle motor rotation speed to select the first or second data storage location.

2. The device of claim 1, further comprising a memory coupled to the controller and a table stored in the memory including information to identify data storage locations of the one or more data storage media that do not have valid primary data stored to them to provide the second data storage location.

3. The device of claim 2, wherein the table lists data storage locations that have valid primary data stored to them.

4. The device of claim 2, wherein the table lists the data storage locations that do not have valid primary data stored to them.

5. The device of claim 2, wherein the table lists data storage locations that have had data from the first data storage location mirrored to them.

6. The device of claim 1, wherein the controller enables the data mirroring function when there are enough data storage locations that do not have valid primary data stored to them to mirror all user data stored on the one or more data storage media.

7. The device of claim 1, wherein the controller enables the data mirroring function when there are enough data storage locations that do not have valid primary data stored to them to mirror a selected subset of user data stored on the one or more data storage media.

8. The device of claim 7, wherein the selected subset is chosen based on an indicator selected from the group consisting of a criticality of the data, a type of the data, and an indicator from a host received by the controller.

9. The device of claim 1, wherein the controller disables the data mirroring function when there are not enough data storage locations that do not have valid primary data stored to them to mirror a selected set of user data stored on the one or more data storage media.

10. The device of claim 1, wherein the controller is configured to determine the access time to retrieve data from the first or second data storage location and the selection algorithm uses the access time to select the first or second data storage location having the fastest access time.

11. The device of claim 1, wherein the controller is configured to determine the energy estimate to retrieve data from the first or second data storage location and the selection algorithm uses the energy estimate to selects the first or second data storage location.

12. The device of claim 1, wherein the controller is configured to determine the noise estimate to retrieve data from the first or second data storage location and the selection algorithm uses the noise estimate to select the first or second data storage location to retrieve the data.

13. The device of claim 2, wherein the memory is a solid state non-volatile memory and the table is stored in the solid state non-volatile memory.

14. The device of claim 2, wherein the controller can selectively enable and disable the data mirroring function based on the information in the table and the controller can selectively enable and disable the data mirroring function without receiving direction from a source external to the device.

15. The device of claim 1 wherein the one or more data storage media includes a rotatable disc and the first and second data storage locations are located in different regions of the disc.

16. The device of claim 1 wherein the one or more data storage media includes a plurality of different non-volatile storage media.

17. The device of claim 10 wherein the controller utilizes the head position to determine a first access time to retrieve data from the first data storage location and a second access time to retrieve data from the second data storage location and the selection algorithm use the first and second access times to select the first or second data storage location.

18. The device of claim 11 wherein the controller determines the energy estimate based upon the rotational speed of the spindle motor.

19. A method comprising:
storing information in a memory to allow identification of data storage locations of one or more data storage media that do not have valid primary data stored at them;
selectively enabling a data mirroring function to copy valid primary data from a first data storage location to a second data storage location when the second data storage location does not have valid primary data stored to it;
copying the first valid primary data from the first data storage location to the second data storage location when the data mirroring function is enabled;
selectively disabling the data mirroring function when a number of data storage locations without valid primary data stored to them is below a threshold;
while the data mirroring function is disabled:
monitoring the data storage locations and modifying the information in the memory when valid primary data is unwritten from the data storage locations; and
when the information in the memory indicates that the number of the data storage locations that do not have valid primary data stored to them exceeds the threshold, enabling the data mirroring function again.

20. The method of claim 19, further comprising:
storing additional information in the memory to identify that the second data storage location has secondary data stored at it;
modifying the additional information to indicate that the second data storage location does not have secondary data stored at it when the data mirroring function is disabled.

21. A method comprising:
storing information in a memory of a data storage device to identify data storage locations of one or more data storage media that do not have valid primary data written to them;
selectively enabling a data mirroring function to copy valid primary data from a first data storage location to a second data storage location that does not have valid primary data stored to it;
copying the first valid primary data in the first data storage location to the second data storage location when the data mirroring function is enabled;
determining at least one of access time, energy estimate or noise estimate to retrieve the data from the first or second data storage location; and
selecting one of the first or second data storage locations to retrieve the data using the at least one of access time, energy estimate or noise estimate and retrieving the data from the selected first or second data storage location.

22. A device comprising:
one or more data storage media; and
a controller operably coupled to the one or more data storage media to selectively enable a data mirroring function to copy data in a first data storage location to one or more second data storage locations of the one or more data storage media when the one or more second data storage locations do not have valid primary data stored to them, wherein the controller enables the data mirroring function when there are enough data storage locations on the one or more data storage media that do not have valid primary data stored to them to mirror a selected subset of user data stored on the one or more data storage media, wherein the selected subset is chosen based on an indicator selected from the group consisting of a criticality of the data, a type of the data, and an indicator from a host received by the controller.

23. The device of claim 21 wherein the first and second data storage locations are located in different regions of a rotatable disc and the step of determining the at least one of access time, energy estimate or noise estimate comprises:
   determining access times for retrieving data from the first and second data storage locations using a position of the head relative to the first and second data storage locations.

24. The method of claim 21 wherein the first data storage location is on a rotatable disc and the second data storage location is on a flash memory and the step of determining the at least one of access time, energy estimate or noise estimate comprises:
   using a spindle motor rotation speed to provide the energy estimate or the noise estimate to retrieve the data from the first data storage location; and
   selecting the second data storage location if the spindle speed is low and the energy estimate required to increase the spindle motor rotation speed to retrieve the data from the first data storage location is less efficient than to retrieve the data from the second data storage location or selecting the second data storage location if the noise estimate is high to retrieve the data from the first data storage location.

* * * * *